US011777673B2

(12) United States Patent
Zhang et al.

(10) Patent No.: US 11,777,673 B2
(45) Date of Patent: Oct. 3, 2023

(54) MULTIPLEXING OF UPLINK CONTROL INFORMATION FOR OPERATION WITH MULTIPLE TRANSMISSION-RECEPTION POINTS

(71) Applicant: Apple Inc., Cupertino, CA (US)

(72) Inventors: Yushu Zhang, Beijing (CN); Dawei Zhang, Saratoga, CA (US); Haijing Hu, Beijing (CN); Wei Zeng, San Diego, CA (US); Yang Tang, Cupertino, CA (US); Haitong Sun, Irvine, CA (US); Yuchul Kim, Santa Clara, CA (US); Hong He, Cupertino, CA (US); Chunhai Yao, Beijing (CN); Chunxuan Ye, San Diego, CA (US); Weidong Yang, San Diego, CA (US); Oghenekome Oteri, San Diego, CA (US); Jie Cui, San Jose, CA (US); Fangli Xu, Beijing (CN); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 255 days.

(21) Appl. No.: 17/052,109

(22) PCT Filed: Nov. 7, 2019

(86) PCT No.: PCT/CN2019/116266
§ 371 (c)(1),
(2) Date: Oct. 30, 2020

(87) PCT Pub. No.: WO2021/087867
PCT Pub. Date: May 14, 2021

(65) Prior Publication Data
US 2022/0278786 A1 Sep. 1, 2022

(51) Int. Cl.
*H04L 5/00* (2006.01)

(52) U.S. Cl.
CPC .......... *H04L 5/0035* (2013.01); *H04L 5/0051* (2013.01)

(58) Field of Classification Search
CPC ... H04L 5/0035; H04L 5/0051; H04L 5/0053; H04W 72/23; H04W 72/21; H04W 72/1268
See application file for complete search history.

(56) References Cited

U.S. PATENT DOCUMENTS

2018/0227031 A1  8/2018  Guo et al.
2019/0174466 A1  6/2019  Zhang et al.
(Continued)

FOREIGN PATENT DOCUMENTS

| CN | 109952803 A | 6/2019 |
| WO | 2018097680 A1 | 5/2018 |
| WO | 2019174530 A1 | 9/2019 |

OTHER PUBLICATIONS

International Search Report and Written Opinion for Application No. PCT/CN2019/116266, dated Aug. 5, 2020; 9 pages.
(Continued)

*Primary Examiner* — Dady Chery
(74) *Attorney, Agent, or Firm* — Kowert, Hood, Munyon, Rankin & Goetzel, P.C.

(57) ABSTRACT

A user equipment (UE) communicates with transmission-reception points (TRPs). When the UE generates uplink control information (UCI), it determines a higher layer index (HLI) value to target the UCI to the appropriate TRP. (Possible values of the HLI are associated with the TRPs.) For UCI on Physical Uplink Control Channel (PUCCH), the HLI value may be determined: based on an HLI value configured for a control resource set (CORESET), or for particular Physical Uplink Control Channel (PUCCH) resources; based on UCI type or spatial relation data or an index related to PUCCH resources. For UCI on a config- (Continued)

ured-grant Physical Uplink Shared Channel (PUSCH), the HLI value may be based on higher layer signals or an indicator relating to channel sounding on spatial relation data. For UCI on MsgA PUSCH in a two-step random access procedure, the HLI value may be based on PUSCH resource unit or PUSCH opportunity.

20 Claims, 9 Drawing Sheets

(56) References Cited

U.S. PATENT DOCUMENTS

| | | | |
|---|---|---|---|
| 2020/0008231 A1 | 1/2020 | Vilaipornsawai et al. | |
| 2021/0091915 A1* | 3/2021 | Khoshnevisan | H04W 72/53 |
| 2021/0105750 A1* | 4/2021 | Khoshnevisan | H04L 1/1614 |
| 2021/0105778 A1* | 4/2021 | Zhou | H04W 72/046 |
| 2021/0112561 A1* | 4/2021 | Zhou | H04W 80/02 |
| 2021/0127285 A1* | 4/2021 | Khoshnevisan | H04W 24/08 |
| 2022/0338222 A1* | 10/2022 | Kim | H04L 1/1642 |

OTHER PUBLICATIONS

Qualcomm Incorporated; Mutli-TRP Enhancements 3GPP TSG-RAN Wg1 Meeting #98bis R1-1911126, Oct. 20, 2019.

Apple Inc.; Remaining Issues on Multi-TRP Enhancement 3GPP TSG-RAN WG1 Meeting #98bis R1-1910968 Oct. 20, 2019.

Extended European Search Report for EP Patent Application No. 19926742.8; dated Nov. 17, 2021.

Huawei et al. "Summary of Remaining Issues and Agreements for Enhancements on Multi-TRP/panel transmission"; 3GPP TSG RAN WG1 Meeting #98bis R1-1911426; Chongqing, China; Oct. 20, 2019.

Intel Corporation "On multi-TRP/multi-panel transmission"; 3GPP TSG RAN WG1 Meeting #98b R1-1910668; Chongqing, China; Oct. 20, 2019.

* cited by examiner

1100 associate a value of a higher layer index (HLI) with a control resource set (CORESET) in response to receiving a configuration message indicating the higher layer index value for the CORESET  1115 in response to decoding, from the CORESET, a Physical Downlink Control Channel (PDCCH) that schedules an aperiodic report of control information in a Physical Uplink Control Channel (PUCCH), transmit the PUCCH based on the value of the higher layer index to target a transmission-reception point (TRP) associated with the higher layer index value  1120

*FIG. 11*

1200 receive a downlink message that configures resources for transmission of a semi-persistent type and/or a periodic type of control information in a Physical Uplink Control Channel (PUCCH) 1210 transmit the PUCCH based on a higher layer index value corresponding to a selected control resource set (CORESET) from a plurality of configured CORESETs, to target a transmission-reception point (TRP) associated with the higher layer index value  1220

*FIG. 12*

1300 receive a configuration message from a first transmission-reception point (TRP), wherein the configuration message indicates a value of a higher layer index (HLI)   1310

transmit a Physical Uplink Control Channel (PUCCH) based on the value of the higher layer index to target the first TRP   1320

*FIG. 13*

1400 determine a value of a higher layer index (HLI) for a Physical Uplink Control Channel (PUCCH) to be transmitted, wherein the HLI value is associated with a transmission-reception point (TRP)   1410

transmit the PUCCH based on the value of the higher layer index to target the PUCCH to the TRP   1420

*FIG. 14*

1500 determine a value of a higher layer index (HLI) for a configured-grant Physical Uplink Shared Channel (PUSCH) to be transmitted, wherein the HLI value is associated with a transmission-reception point (TRP) 1510

transmit the PUSCH based on the value of the higher layer index to target the PUSCH to the TRP 1520

*FIG. 15*

1600 determine a value of a higher layer index (HLI) for a Physical Uplink Shared Channel (PUSCH) to be transmitted as part of a two-step random access procedure, wherein the HLI value is associated with a transmission-reception point (TRP) 1610

transmit the PUSCH based on the value of the higher layer index in order to target the PUSCH to the TRP 1620

*FIG. 16*

MULTIPLEXING OF UPLINK CONTROL INFORMATION FOR OPERATION WITH MULTIPLE TRANSMISSION-RECEPTION POINTS

PRIORITY CLAIM INFORMATION

This application is a national phase entry of PCT application number PCT/CN2019/116266, entitled "Multiplexing of Uplink Control Information for Operation with Multiple Transmission-Reception Points," filed Nov. 7, 2019, which is hereby incorporated by reference in its entirety as though fully and completely set forth herein. The claims in the instant application may be different than those of the parent application or other related applications. The Applicant therefore rescinds any disclaimer of claim scope that may have been made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms enabling a user equipment device to transmit uplink control information targeted for one among a plurality of communicating transmission-reception points (TRPs).

DESCRIPTION OF THE RELATED ART

A wireless user equipment (UE) device may communicate with a plurality of TRPs. The TRPs may have non-ideal backhaul between them. Thus, the UE device may need to transmit uplink control information (UCI) to each of the TRPs instead of relying on the TRPs to forward control information to the relevant party. UCI may include information such as Scheduling Request (SR), beam failure recovery (BFR), ACK (Acknowledgement) or NACK (Negative Acknowledgement) of a Hybrid Automatic Repeat Request (HARQ) protocol, feedback of channel state information (CSI) and beam reports, etc. Beam reports may include, e.g., Reference Signal Received Power (RSRP) reports and Signal to Interference-and-Noise Ratio (SINR) reports.

Thus, when the UE device has control information to transmit, it needs to be able to determine which TRP the control information should be transmitted to.

SUMMARY

In some embodiments, a user equipment (UE) communicates with transmission-reception points (TRPs). When the UE generates uplink control information (UCI), it may determine a higher layer index (HLI) value (or pool index value) to target its transmission of the UCI to the appropriate TRP. (Possible values of the HLI are associated with the TRPs, e.g., in a one-to-one fashion.) The HLI value may be determined in any of various ways.

In some embodiments, for uplink control information to be transmitted on a Physical Uplink Control Channel (PUCCH), the HLI value may be determined, e.g., based on: an HLI value configured for a downlink control resource set (CORESET); or an HLI value included in a Medium Access Control-Control Element (MAC CE) for activation of a semi-persistent PUCCH; or an HLI value configured for particular Physical Uplink Control Channel (PUCCH) resources; or an HLI value configured in spatial relation information for the PUCCH; or an index related to PUCCH resources; or a type of the uplink control information.

In some embodiments, for uplink control information to be transmitted on a configured-grant Physical Uplink Shared Channel (PUSCH), the HLI value may be determined, e.g., based on: higher layer signaling such as Radio Resource Control (RRC) signaling; or an indicator relating to sounding reference signals (SRS); or an HLI value included in spatial relation information for the SRS. In some embodiments, the term "higher layer signaling" refers to signaling transmitted to the UE device from a layer above the physical layer, e.g., from the Radio Resource Control (RRC) layer or the Medium Access Control (MAC) layer.

In some embodiments, for uplink control information to be transmitted on a MsgA PUSCH in a two-step random access procedure, the HLI value may be determined, e.g., based on: an HLI value configured for a PUSCH resource unit; or an HLI value configured for a PUSCH opportunity; or a predefined common HLI value for MsgA PUSCH transmissions.

In some embodiments, a method for operating a wireless user equipment (UE) device may include one or more of the following operations.

The method may include associating a value of a higher layer index (HLI) with a control resource set (CORESET) in response to receiving a configuration message indicating the higher layer index value for the CORESET.

In response to decoding, from the CORESET, a Physical Downlink Control Channel (PDCCH) that schedules an aperiodic report of control information in a Physical Uplink Control Channel (PUCCH), the method may include transmitting the PUCCH based on the value of the higher layer index to target a transmission-reception point (TRP) associated with the higher layer index value.

In some embodiments, a method for operating a wireless user equipment (UE) device may include one or more of the following operations.

The method may include receiving a downlink message that configures resources for transmission of a semi-persistent type and/or a periodic type of control information in a Physical Uplink Control Channel (PUCCH).

The method may include transmitting the PUCCH based on a higher layer index value corresponding to a selected control resource set (CORESET) from a plurality of configured CORESETs to target a transmission-reception point (TRP) associated with the higher layer index value.

In some embodiments, a method for operating a wireless user equipment (UE) device may include one or more of the following operations.

The method may include receiving a configuration message from a first transmission-reception point (TRP), wherein the configuration message indicates a value of a higher layer index (HLI).

The method may include transmitting a Physical Uplink Control Channel (PUCCH) based on the value of the higher layer index to target the first TRP.

In some embodiments, a method for operating a wireless user equipment (UE) device may include one or more of the following operations.

The method may include determining a value of a higher layer index (HLI) for a Physical Uplink Control Channel (PUCCH) to be transmitted, wherein the HLI value is associated with a transmission-reception point (TRP).

The method may include transmitting the PUCCH based on the value of the higher layer index to target the PUCCH to the TRP.

In some embodiments, a method for operating a wireless user equipment (UE) device may include one or more of the following operations.

The method may include determining a value of a higher layer index (HLI) for a configured-grant Physical Uplink Shared Channel (PUSCH) to be transmitted, wherein the HLI value is associated with a transmission-reception point (TRP).

The method may include transmitting the PUSCH based on the value of the higher layer index to target the PUSCH to the TRP.

In some embodiments, a method for operating a wireless user equipment (UE) device may include one or more of the following operations.

The method may include determining a value of a higher layer index (HLI) for a Physical Uplink Shared Channel (PUSCH) to be transmitted as part of a two-step random access procedure, wherein the HLI value is associated with a transmission-reception point (TRP).

The method may include transmitting the PUSCH based on the value of the higher layer index in order to target the PUSCH to the TRP.

BRIEF DESCRIPTION OF THE DRAWINGS

A better understanding of the present subject matter can be obtained when the following detailed description of the preferred embodiment is considered in conjunction with the following drawings.

FIG. 11 illustrates an example of a method for associating a higher level index value with a control resource set (CORESET), according to some embodiments.

FIG. 12 illustrates an example of a method for assigning a value of a higher layer index to a PUCCH based on a selected control resource set, according to some embodiments.

FIG. 13 illustrates an example of a method for configuring a higher level index value for transmission of a PUCCH to a TRP, according to some embodiments.

FIG. 14 illustrates an example of a method for determining a higher level index value for a PUCCH to be transmitted to a TRP, according to some embodiments.

FIG. 15 illustrates an example of a method for determining a higher level index value for a configured-grant PUCCH to be transmitted to a TRP, according to some embodiments.

FIG. 16 illustrates an example of a method for determining a value of a higher layer index (HLI) for a Physical Uplink Shared Channel (PUSCH) to be transmitted as part of a two-step random access procedure, according to some embodiments.

Figure 1:
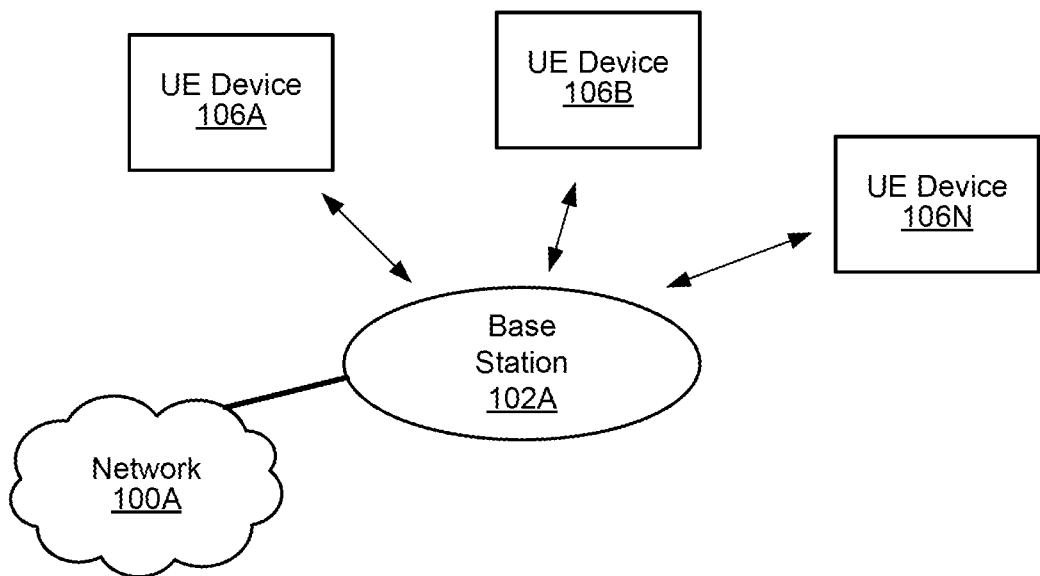
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: $5^{th}$ Generation New Radio
BW: Bandwidth
BWP: Bandwidth Part
CA: Carrier Aggregation
CQI: Channel Quality Indictor
CSI: Channel State Information
DC: Dual Connectivity
DCI: Downlink Control Information
DL: Downlink
eNB (or eNodeB): Evolved Node B, i.e., the base station of 3GPP LTE
eUICC: embedded UICC
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Medium Access Control
MAC-CE: MAC Control Element
NR: New Radio
NR-DC: NR Dual Connectivity
NW: Network
PDCCH: Physical Downlink Control Channel
PDSCH: Physical Downlink Shared Channel
PUCCH: Physical Uplink Control Channel
PUSCH: Physical Uplink Shared Channel
RACH: Random Access Channel
RAT: Radio Access Technology
RLC: Radio Link Control
RLM: Radio Link Monitoring
RRC: Radio Resource Control
RRM: Radio Resource Management
RS: Reference Signal
SR: Scheduling Request
SRS: Sounding Reference Signal SSB: Synchronization Signal Block
TRP: Transmission-Reception Point
UCI: Uplink Control Information
UE: User Equipment
UL: Uplink
UMTS: Universal Mobile Telecommunications System

TERMS

The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
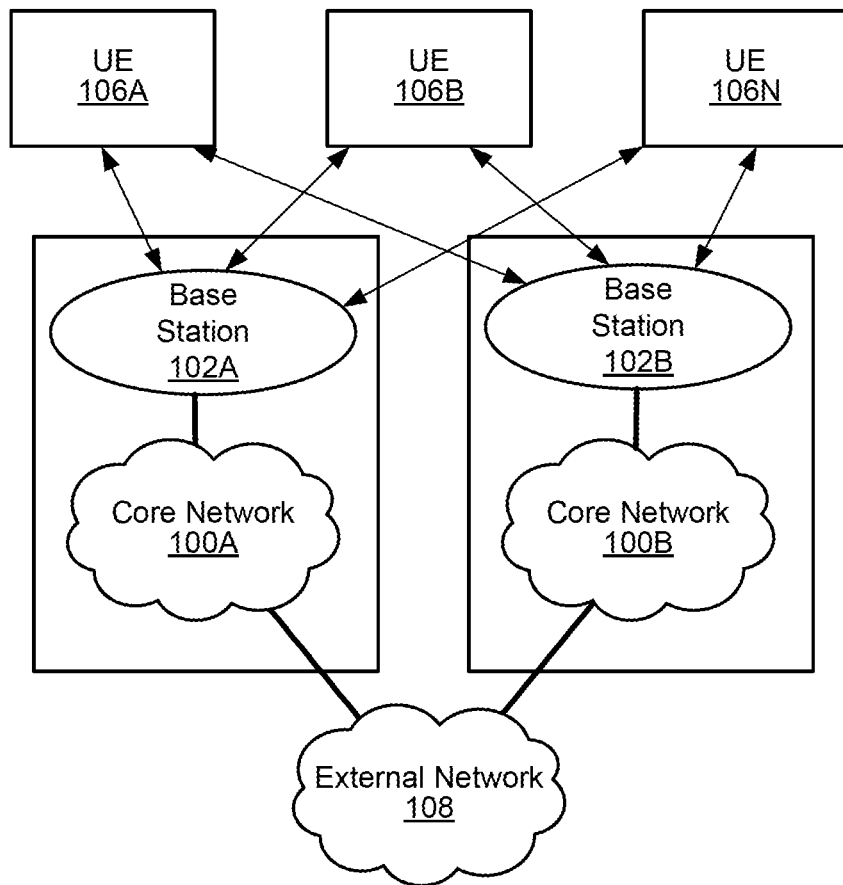
Figure 3:
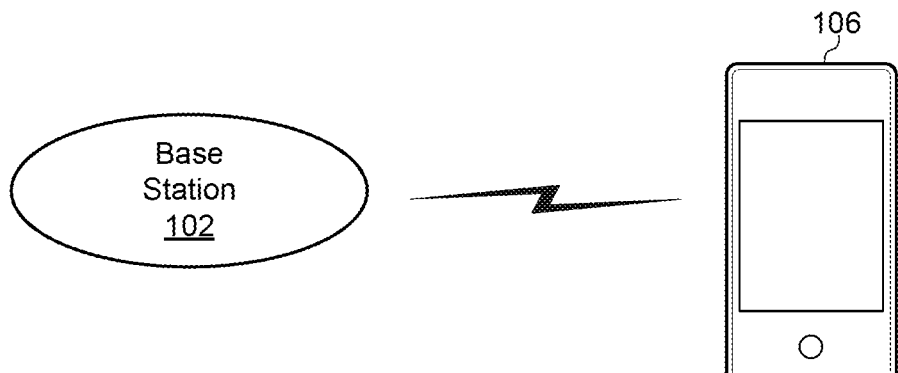
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 5G NR, 3GPP2 CDMA2000 (e.g., 1×RTT, 1×EV-DO, HRPD, eHRPD), Wi-Fi, WiMAX, etc.

For example, base station 102A and core network 100A may operate according to a first cellular communication standard (e.g., 5G NR) while base station 102B and core network 100B operate according to a second (e.g., different) cellular communication standard (e.g., LTE, GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., 5G NR, LTE, CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus, in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as 5G NR or LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, LTE-A and 5G NR). Thus, as noted above, a UE 106 might be configured to communicate with base station 102A (and/or other base stations) according to a first cellular communication standard (e.g., 5G NR) and might also be configured to communicate with base station 102B (and/or other base stations) according to a second cellular communication standard (e.g., LTE, one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, eHRPD, etc.), LTE, LTE-A, 5G NR, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
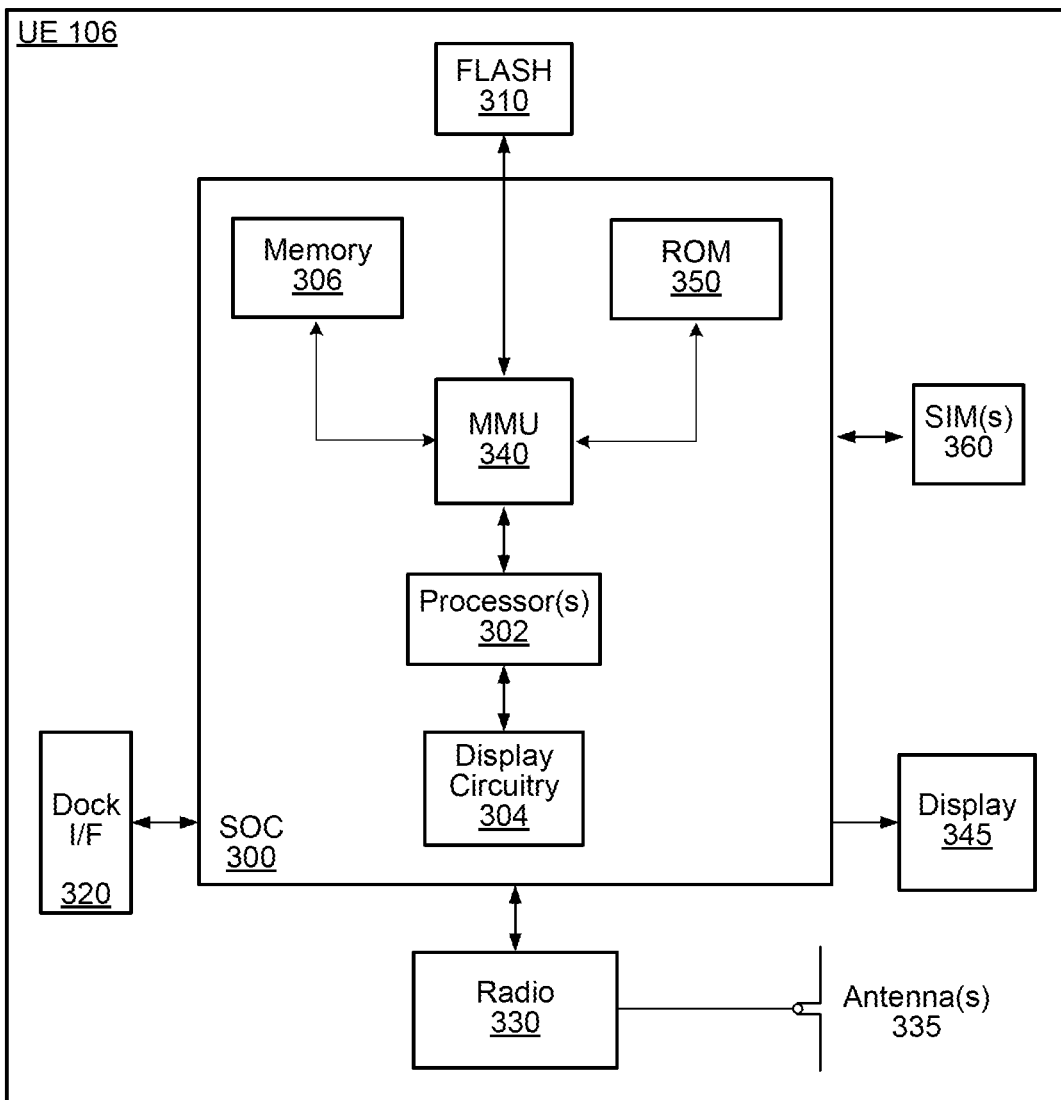
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, 5G NR, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, 5G NR, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removeable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
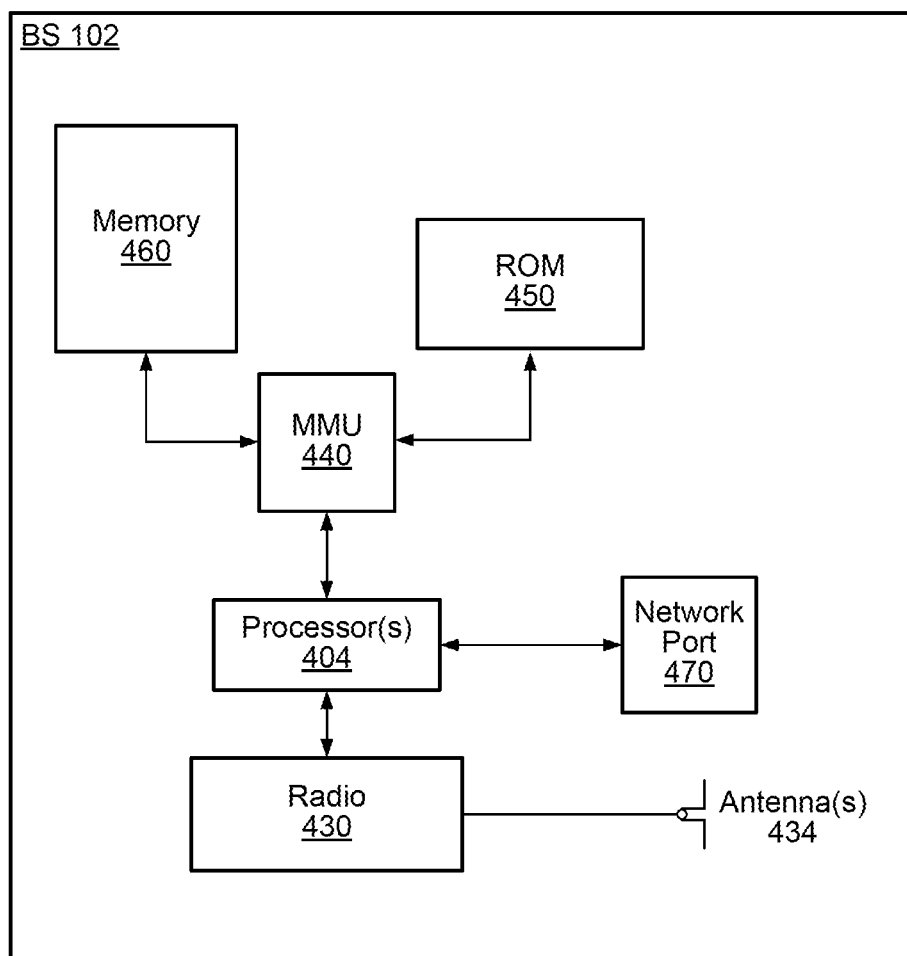
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, LTE-A, 5G NR, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Wireless User Equipment Device 600

Figure 6:
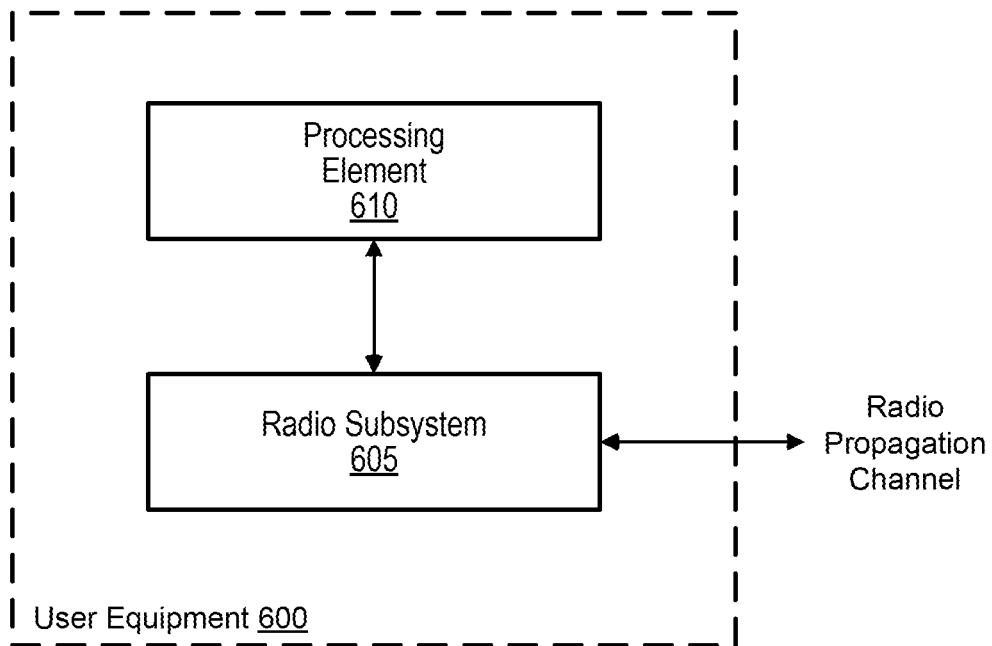
FIG. 6 illustrates an example of a user equipment device 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or arrays of antennas) to facilitate signal transmission and reception. Each RF chain (or, some of the RF chains) may be tunable to a desired frequency, thus allowing the RF chain to receive or transmit at different frequencies at different times.

The radio subsystem 605 may be coupled to one or more antenna panels (or antenna arrays), e.g., to support beamforming of received downlink signals and/or transmitted uplink signals.

The processing element 610 may be coupled to the radio subsystem, and may be configured as variously described above. (For example, the processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In various embodiments described herein, when a processing element of a wireless user equipment device is said to transmit and/or receive information to/from a wireless base station (or Transmission-Reception Point), it should be understood that such transmission and/or reception occurs by the agency of a radio subsystem such as radio subsystem 605. Transmission may involve the submission of signals and/or data to the radio subsystem, and reception may involve the action of receiving signals and/or data from the radio subsystem.

In some embodiments, the UE device 600 may include beamforming circuitry. The beamforming circuitry may be configured to receive downlink signals from respective antennas of an antenna array of the UE device, and to apply receive beamforming to the downlink signals. For example, the beamforming circuitry may apply weights (e.g., complex weights) to the respective downlink signals, and then combine the weighted downlink signals to obtain a beam signal, where the weights define a reception beam. The beamforming circuitry may also be configured to apply weights to respective copies of an uplink signal, and to transmit the weighted uplink signals via respective antennas of the antenna array of the UE device, wherein the weights define a transmission beam. In some embodiments, beamforming may be applied to transmissions of the Physical Uplink Control Channel (PUCCH) and the Physical Uplink Shared Channel (PUSCH). The UE device apply beamforming to target different transmissions (e.g., PUCCH transmissions, or PUSCH transmissions) to different Transmission-Reception Points (TRPs), e.g., base stations.

In some embodiments, the beamforming circuity may be implemented by (or included in) the processing element 610. In other embodiments, beamforming circuitry may be included in the radio subsystem 605.

In some embodiments, the UE device 600 (e.g., the processing element 610) may be configured to receive configuration messages from the base station. Configuration message may direct the UE device to set parameters for control behavior of the UE device to make and report measurements to the base station, etc. Configuration messages may request any of different types of reporting, e.g., periodic, semi-static, aperiodic, etc. Configuration messages may indicate any of different types of measurements, e.g., signal to interference-and-noise ratio (SINR), any of various types of channel quality information (CQI), reference signal receiver power (RSRP), etc.

In some embodiments, the radio subsystem 605 may be configured to transmit and receive in a plurality of frequency bands (or frequency ranges). One or more of those frequency bands may occur in the millimeter wave regime of the electromagnetic spectrum, where the effects of propagation loss and signal blockage may be significant. Thus, the use of beamforming at the UE device 600 (and/or at the base station) may be useful in mitigating such effects. To enhance the effectiveness of beamforming, the UE device 600 may provide reports of signal quality on one or more beams, e.g., as configured by the base station.

In some embodiments, the UE 600 (e.g., the processing element) may support carrier aggregation. Carrier aggregation (CA) involves the concatenation of a plurality of component carriers (CCs), which increases the bandwidth and data rate to and/or from the UE 600. When carrier aggregation is employed, the timing of frames may be aligned across cells involved in the aggregation. Different embodiments may support different maximum bandwidths and numbers of component carriers. In some embodiments, the UE 600 may concatenate component carriers from two or more base stations, of the same or different radio access technology. (For example, in some embodiments, the UE may perform carrier aggregation with an eNB of 3GG LTE and a gNB of 5G NR.) In some embodiments, the UE 600 may support both contiguous carriers and non-contiguous carriers.

In some embodiments, in a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

In some embodiments, aperiodic PUCCH/PUSCH may be scheduled by PDCCH received from a TRP.

In some embodiments, the resource(s) for semi-persistent and periodic PUCCH, and for configured-grant and msgA PUSCH, may be configured in RRC.

In some embodiments, the activation of semi-persistent PUCCH may be by MAC CE.

In some embodiments, the UE device is configured, e.g., by one or more Transmission-Reception Points (TRPs), with one or more control resource sets (CORESETs). A CORESET may be a set of downlink physical resources within which a TRP is constrained to transmit PDCCHs. Thus, a UE device may limit its search for PDCCHs to the one or more configured CORESETs. Each TRP may transmit a configuration message to the UE device to define one or more CORESETs. Different TRPs may be expected to transmit PDCCHs in different CORESETs. The TRPs may communicate through backhaul to agree on use of non-overlapping CORESETs.

In some embodiments, the physical resource for a PUCCH transmission to one TRP is always disjoint from the physical resource for PUCCH transmission to another TRP. The TRPs may communicate via backhaul to agree upon non-overlapping sets of physical resources for uplink transmissions.

In some embodiments, in a 2-step random access procedure (RAP), a first message, referred to as MsgA, may be transmitted by the UE, and a second message, referred to as MsgB, may be received by the UE. For example, a user equipment (UE) may transmit MsgA to a base station (e.g., a gNB of 5G NR). MsgA may include a preamble and a Physical Uplink Shared Channel (PUSCH). The PUSCH may include a Common Control Channel (CCCH). The CCCH may include one or more Radio Resource Control (RRC) messages, e.g., messages such as RRC CONNECTION SETUP REQUEST, RRC CONNECTION REESTABLISHMENT REQUEST, RRC CONNECTION RESUME REQUST, etc. In response to receiving MsgA, the gNB may transmit MsgB. Downlink control information (DCI) in a Physical Downlink Control Channel (PDCCH) may schedule the MsgB in the Physical Downlink Shared Channel (PDSCH).

The processing element 610 may be further configured as variously described in the sections below.

Wireless Base Station 700

Figure 7:
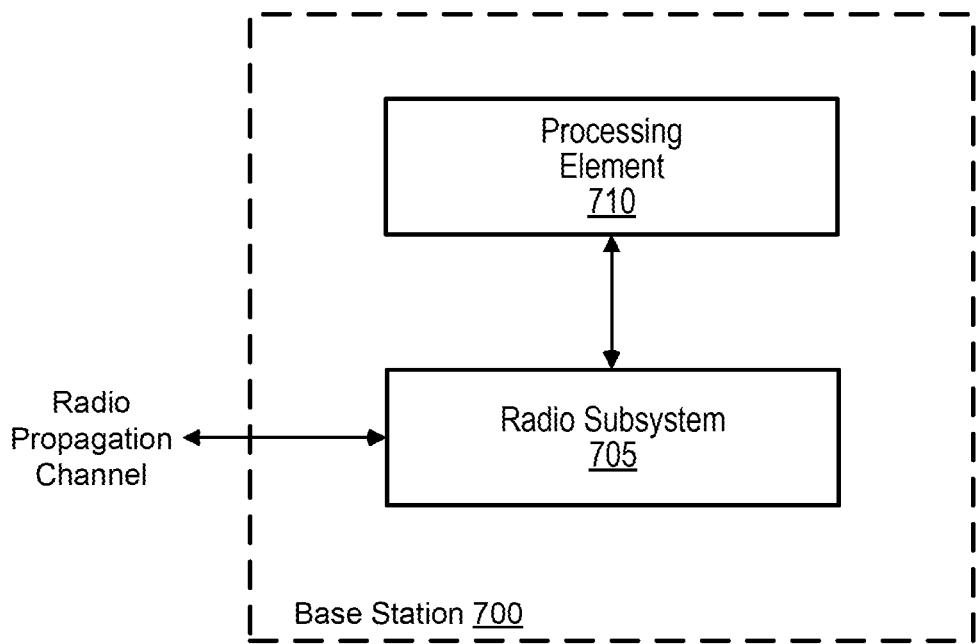
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.) In some embodiments, the transmission-reception points (TRPs) disclosed herein may be realized by base stations such as base station 700.

The radio subsystem 710 may include one or more RF chains. Each RF chain may be tunable to a desired frequency, thus allowing the RF chain to receive or transmit at different frequencies at different times.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

In some embodiments, the base station 700 may include beamforming circuity. The beamforming circuity may be configured to receive uplink signals from respective antennas of an antenna array of the base station, and to apply receive beamforming to the uplink signals. For example, the beamforming circuity may apply weights (e.g., complex weights) to the respective uplink signals, and then combine the weighted uplink signals to obtain a beam signal, where the weights define a reception beam. Different reception beams may be used to receive from different UE devices. The beamforming circuity may also be configured to apply weights to respective copies of a downlink signal, and to transmit the weighted downlink signals via respective antennas of the antenna array of the base station, where the weights define a transmission beam. Different transmission beams may be used to transmit to different UE devices.

In some embodiments, the beamforming circuity may be implemented by (or included in) the processing element 710. In other embodiments, beamforming circuity may be included in the radio subsystem 705.

The processing element 710 may be configured to perform any of the base station method embodiments described herein.

In some embodiments, the base station 700 may configure a control resource set (CORESET) for a UE device, and optionally configure a value of a higher layer index (HLI) for the CORESET. In some embodiments, the base station 700 may configure one or more control resource sets (CORESETs) for a UE device, and optionally configure an HLI value for the one or more CORESETs (or, for a subset of the one or more CORESETs).

In some embodiments, the base station 700 may transmit Radio Resource Control (RRC) messages to the UE device via the Physical Downlink Shared Channel (PDSCH). For example, a message that configures resources for a semi-persistent/periodic PUCCH may be transmitted in the PDSCH. As another example, a message that configures resources for MsgA PUSCH of 2-step random access procedure (RACH) may be transmitted in a PDSCH.

Multiplexing Uplink Control Information for Multi-TRP Operation

For multi-TRP operation with non-ideal backhaul, the ACK/NACK and other Uplink Control Information (UCI) may need to be separately reported to each TRP. (TRP is an acronym for Transmission and Reception Point. Multi-TRP refers to multiple Transmission and Reception Points. ACK is an acronym for Acknowledgement. NACK is an acronym for Negative Acknowledgement.) In some embodiments, the TRPs may be base stations, e.g., gNBs of 5G New Radio.

The ACK/NACK and other UCI may be reported by PUCCH or PUSCH. (PUCCH is an acronym for Physical Uplink Control Channel. PUSCH is an acronym for Physical Uplink Shared Channel.)

In each Control Resource Set (CORESET), a higher layer index is configured to indicate the targeting TRP.

Each PUCCH resource can be associated with one higher layer index.

The PUSCH can be associated with higher layer index from the scheduling PDCCH.

The UE preferably does not overlap transmissions of PUCCHs/PUSCHs to different TRPs.

Figure 8:
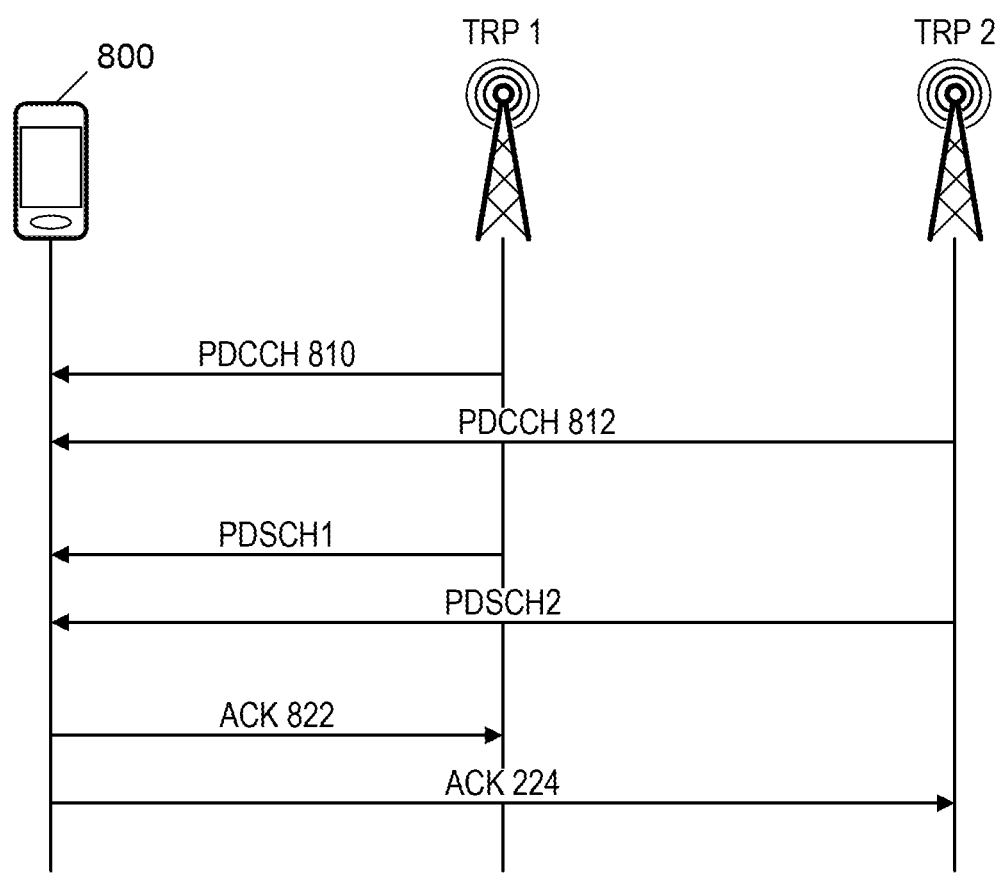
FIG. 8 illustrates an example of a user equipment (UE) device configured for communication with multiple transmission and reception points (TRPs), according to some embodiments.

In some embodiments, a user equipment (UE) device 800 may be configured for communication with multiple transmission and reception points (TRPs), as shown in FIG. 8. Two TRPs (TRP1 and TRP2) are illustrated, however it should be understood that the number of TRPs may be greater than or equal to two. (In some scenarios, the UE may communicate with only one TRP.) TRP1 may transmit a Physical Downlink Control Channel (PDCCH) 810 to the UE, to schedule a first Physical Downlink Shared Channel (PDSCH1); and TRP2 may transmit a PDCCH 812 to the UE, to schedule a second PDSCH (PDSCH2). Furthermore, TRP1 may transmit PDSCH1 to the UE, and TRP2 may transmit PDSCH2 to the UE. The UE may transmit an acknowledgement (ACK) message 822 to TRP1, e.g., acknowledging successful reception of downlink data from the PDSCH1. Similarly, the UE may transmit an ACK message 824 to TRP2, e.g., acknowledging successful reception of downlink data from the PDSCH2. While ACK messages are transmitted in the illustrated example, any of various kinds (or combinations of kinds) of control information may be transmitted in other scenarios. While FIG. 8 illustrates omni-directional patterns of radiation at TRP1 and TRP2, it should be understood that the TRPs may apply beamforming to downlink signals to specifically target trans-

Defining the Association Between PUCCH and Higher Layer Index per CORESET

In some embodiments, the association between PUCCH and higher layer index may be defined per CORESET.

In some embodiments, for control information to be transmitted via aperiodic PUCCH, the aperiodic PUCCH may be associated with the higher layer index (HLI) configured for the CORESET with the scheduling PDCCH. The higher layer index may be, e.g., included in the configuration message that defines the CORESET. While this CORSET configuration message may have any of a wide variety of structures, in one particular embodiment, it has the following structure.

```
ControlResourceSet ::=                      SEQUENCE {
    controlResourceSetId                        ControlResourceSetId,
    higherLayerIndex                            INTEGER (0,1)
    frequencyDomainResources                    BIT STRING (SIZE (45)),
    duration                                    INTEGER (1..maxCoReSetDuration),
    cce-REG-MappingType                         CHOICE {
        interleaved                                 SEQUENCE {
            reg-BundleSize                              ENUMERATED {n2, n3, n6}
            interleaverSize                             ENUMERATED {n2, n3, n6},
            shiftIndex                                  INTEGER(0..maxNrofPhysicalResourceBlocks–1)
                                                            OPTIONAL
        },
        nonInterleaved                              NULL
    },
    precoderGranularity                         ENUMERATED {sameAsREG-bundle,
                                            allContiguousRBs},
    tci-StatesPDCCH-ToAddList                   SEQUENCE(SIZE (1..maxNrofTCI-StatesPDCCH))
                                                OF TCI-StateId OPTIONAL,
                                                    -- Cond NotSIB1-initialBWP
    tci-StatesPDCCH-ToReleaseList               SEQUENCE(SIZE(1..maxNrofTCI-StatesPDCCH))
                                                OF TCI-StateId OPTIONAL,
                                                    -- Cond NotSIB1-initialBWP
    tci-PresentInDCI                            ENUMERATED {enabled}
                                                    OPTIONAL
    pdcch-DMRS-ScramblingID                     INTEGER (0..65535)
                                                    OPTIONAL
    ...
}
``` missions to respective UE devices, and/or, apply beamforming to uplink signals to specifically receive from respective UE devices.

In some embodiments, one or more of the following issues may be addressed by various methods disclosed herein. A first issue concerns how to define the association between PUCCH and higher layer index per control resource set (CORESET). The PUCCH may be (or include) aperiodic PUCCH or semi-persistent PUCCH or periodic PUCCH. The PUCCH may be used for Scheduling Request (SR), beam failure recovery (BFR), HARQ-ACK, CSI feedback and beam report (RSRP/SINR report).

A second issue concerns how to define the association of configured-grant based PUSCH and the PUSCH in 2-step RACH (Random Access) with higher layer index per CORESET.

For dynamic grant based PUSCH, the associated higher layer index can be determined based on the CORESET carrying the scheduling PDCCH. (PDCCH is an acronym for Physical Downlink Control Channel.)

For both issues, after the association is defined, user equipment (UE) can transmit the UCI for the corresponding TRP based on the PUCCH/PUSCH associated with the same higher layer index.

In one set of embodiments, a semi-persistent PUCCH or periodic PUCCH may be associated with a higher layer index configured for a particular CORESET. Various alternatives are contemplated for the particular CORESET.

In some embodiments, the particular CORESET may be the one with lowest CORESET ID. As an example, suppose that a first TRP (TRP1) configures CORESET 1 and 2 with HLI=0 for both; and a second TRP (TRP2) configures CORESET 3 and 4 with HLI=1 for both. In this case, when TRP1 requests a semi-persistent/periodic PUCCH, the semi-persistent/periodic PUCCH may be assigned HLI=0 since that HLI value has been assigned to CORESET 1, which is the CORESET with lowest CORESET ID. Furthermore, TRP2 may refrain from requesting a semi-persistent/periodic PUCCH in the present configuration of CORESETs. (However, TRP2 may still trigger an aperiodic PUCCH; the HLI value for an aperiodic PUCCH may in some embodiments be associated with the corresponding scheduling PDCCH.) If TRP2 needs to request a semi-persistent/periodic PUCCH, it may, e.g., trigger a reconfiguration of the HLI value of CORESET 1 to HLI=1.

In some embodiments, the particular CORESET may be the one with highest CORESET ID. As an example, suppose that a first TRP (TRP1) configures CORESET 1 and 2 with HLI=0 for both; and a second TRP (TRP2) configures CORESET 3 and 4 with HLI=1 for both. In this case, when TRP2 requests a semi-persistent/periodic PUCCH, the semi-persistent/periodic PUCCH may be assigned HLI=1 since that HLI value has been assigned to CORESET 4, which is the CORESET with highest CORESET ID. Furthermore, TRP1 may refrain from requesting a semi-persistent/periodic PUCCH in the present configuration of CORESETs. (However, TRP1 may still trigger an aperiodic PUCCH; the HLI value for an aperiodic PUCCH may in some embodiments be associated with the corresponding scheduling PDCCH.) If TRP1 needs to request a semi-persistent/periodic PUCCH, it may, e.g., trigger a reconfiguration of the HLI value of CORESET 4 to HLI=0.

In some embodiments, the particular CORESET may be a CORESET indicated by higher layer signaling.

Figure 9:
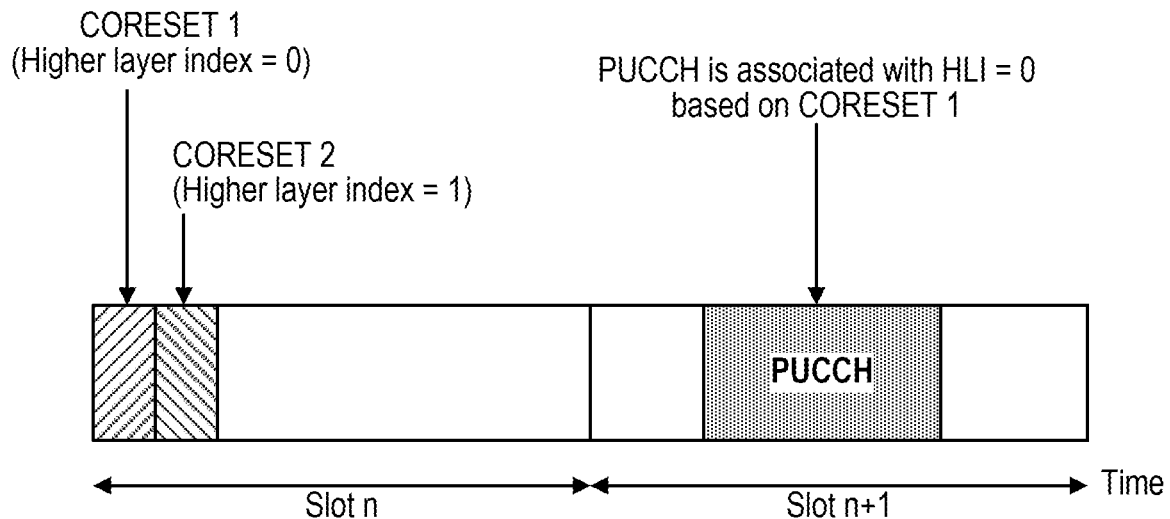
FIG. 9 illustrates an example of a method for assigning a higher level index (HLI) value to a semi-persistent/periodic Physical Uplink Control Channel (PUCCH), according to some embodiments.

In some embodiments, if a plurality of CORESETs are configured, the particular CORESET may be the monitored CORESET with lowest CORESET ID in the latest slot before the PUCCH opportunity, e.g., as illustrated in FIG. 9. A PUCCH is being transmitted in a slot n+1 and is associated with a higher layer index (HLI) value of zero based on a CORESET1 occurring in the previous slot, i.e., slot n. In slot n, CORESET1 and CORESET2 occur in a downlink portion of the slot, and correspond respectively to HLI values 0 and 1.

In some scenarios, a base station (e.g., a gNB of 5G New Radio) may configure two or more CORESETs in the same slot (or symbol) but with respectively different beams. However, in some embodiments, the UE may only be able to receive a subset of the configured CORESETs, e.g., because the UE is limited to using at most $N_{AB}$ analog beams to receive at most $N_{AB}$ signals at a time, where $N_{AB}$ is less than the number of configured CORESETs. Thus, the UE would then monitor only $N_{AB}$ of the CORESETs at a given time, and ignore the others. For example, if $N_{AB}$ equals one, the UE may monitor only one of the CORESETs at a given time.

In some embodiments, a TRP may configure one or more CORESETs. However, the TRP may assign the same HLI value for all the CORESETs that it configures. As an example, a first TRP may configures CORESETs 1 and 2, both with HLI=0; and a second TRP may configure CORESETs 3 and 4, both with HLI=1. A wide variety of other examples are possible.

In some embodiments, if HLI is not configured for a CORESET, the UE may assume HLI is equal to zero.

In some embodiments, for semi-persistent PUCCH, the associated higher layer index may be configured in the activation MAC CE. (MAC CE is an acronym for Medium Access Control-Control Element.) As a further extension, this feature may be applied to the aperiodic/periodic PUCCH.

In some embodiments, the field "HLI" in the MAC CE to activate semi-persistent PUCCH can be used to indicate the value of an associated higher layer index. Other fields in the MAC CE may be the same as defined in 3GPP TS 38.321 section 6.1.3.16.

Figure 10:
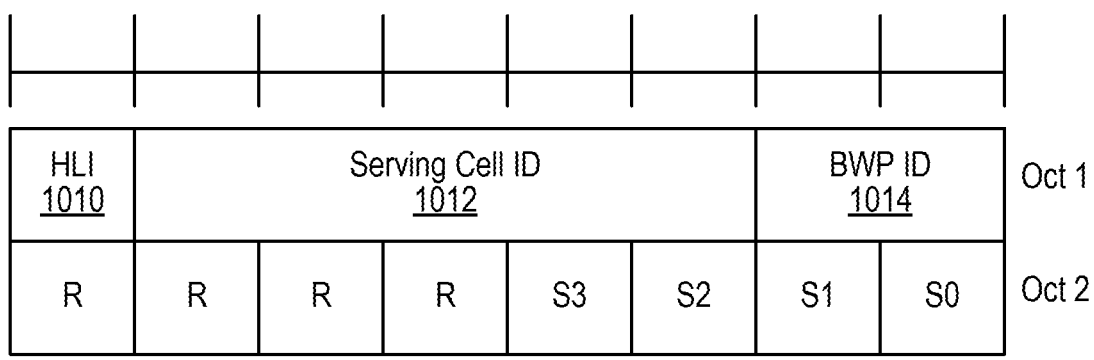
FIG. 10 illustrates an example of a Medium Access Control-Control Element for activating a semi-persistent PUCCH, according to some embodiments.

In some embodiments, the MAC CE may be configured as shown in FIG. 10. The MAC CE may include one or more or all of the following fields: an HLI field 1010, a serving cell UD 1012, a bandwidth part (BWP) ID 1014, one or more reserved fields (denoted "R"), fields S0, S1, S2 and S3.

The serving cell ID may indicate the identity of the serving cell for which the MAC CE applies. The BWP ID may indicate an uplink BWP for which the MAC CE applies as the codepoint of the DCI bandwidth part indicator field, e.g., as specified in TS 38.212. (DCI is an acronym for Downlink Control Information.) In some embodiments, field Si (i=0, 1, 2, 3) may indicate the activation/deactivation status of the Semi-Persistent (SP) CSI report configuration within csi-ReportConfigToAddModList, e.g., as specified in TS 38.331. S0 may refer to the report configuration which includes PUCCH resources for SP CSI reporting in the indicated BWP and has the lowest CSI-ReportConfigId within the list with type set to semiPersistentOnPUCCH. S1 may refer to the report configuration which includes PUCCH resources for SP CSI reporting in the indicated BWP and has the second lowest CSI-ReportConfigId, and so on. If the number of report configurations within the list with type set to semiPersistentOnPUCCH in the indicated BWP is less than i+1, MAC entity may ignore the Si field. For example, the Si field may be set to 1 to indicate that the corresponding Semi-Persistent CSI report configuration shall be activated; and the Si field may be set to 0 to indicate that the corresponding Semi-Persistent CSI report configuration i shall be deactivated. The fields in the MAC CE may be contained in two octets (Oct1 and Oct2), however a wide variety of other sizes are contemplated for the MAC CE.

In some embodiments, a method 1100 for operating a wireless user equipment (UE) device may include the operations shown in FIG. 11. (The method 1100 may also include any subset of the elements, embodiments and features described above in connection with FIGS. 1-10 and below in connection with FIGS. 12-16.) The wireless UE device may be configured as variously described above, e.g., as described in connection with user equipment 600 of FIG. 6. The method 1100 may be performed by a processing element of the UE device.

At 1110, the processing element may associate a value of a higher layer index (HLI) with a control resource set (CORESET) in response to receiving a configuration message indicating the higher layer index value for the CORESET.

At 1115, in response to decoding, from the CORESET, a Physical Downlink Control Channel (PDCCH) that schedules an aperiodic report of control information in a Physical Uplink Control Channel (PUCCH), the processing element may transmit the PUCCH based on the value of the higher layer index in order to target a transmission-reception point (TRP) associated with the higher layer index value. The HLI value may be used, e.g., to select the appropriate set of uplink control information (UCI) for the TRP and to avoid selection of UCI intended for other TRP(s). The UE device may include a memory buffer that include sets of UCI awaiting transmission to respective TRPs. For example, referring now to FIG. 8, the memory buffer may have an acknowledgement (ACK) for a PDSCH transmission from TRP1, and an ACK for a PDSCH transmission from TRP2. The HLI value may be used to select the appropriate ACK to be transmitted in the PUCCH.

In some embodiments, the processing element may associate a second value of the HLI with a second control resource set in response to receiving a second configuration message indicating the second HLI value for the second CORESET. The second CORSET may have been configured by a second TRP, different from the first TRP. In response to decoding, from the second CORESET, a second PDCCH that schedules an aperiodic report of control information in a second PUCCH, the processing element may transmit the second PUCCH based on the second HLI value to target the second TRP, which is associated with the higher layer index value.

In some embodiments, a method 1200 for operating a wireless user equipment (UE) device may include the operations shown in FIG. 12. (The method 1200 may also include any subset of the elements, embodiments and features described above in connection with FIGS. 1-11 and below in connection with FIGS. 13-16.) The wireless UE device may be configured as variously described above, e.g., as described in connection with user equipment 600 of FIG. 6. The method 1200 may be performed by a processing element of the UE device.

At 1210, the processing element may receive a downlink message (e.g., a Radio Resource Control message) that configures resources for transmission of a semi-persistent type and/or a periodic type of control information in a Physical Uplink Control Channel (PUCCH).

In some embodiments, TRPs may be configured so that different TRPs do not trigger respective (semi-persistent/periodic) PUCCHs in the same downlink slot.

Association of PUCCH Resource and HLI by Higher Layer Signaling

In some embodiments, for a PUCCH resource, the associated higher layer index can be configured by higher layer signaling.

In one embodiment, the higher layer index may be explicitly configured per PUCCH resource or per PUCCH resource set, according to some embodiments. The higher layer index (HLI) for the PUCCH resource (or PUCCH resource set) may be configured in a manner consistent with any existing HLI configuration for CORESET(s) corresponding to the transmission-reception point (TRP). For example, if a TRP configures two CORESETs with a given HLI value, the TRP may refrain from configuring a PUCCH resource with a different HLI value.

In another embodiment, the higher layer index may be explicitly configured in spatial relation information for the PUCCH, e.g., as detailed in the text below, according to some embodiments.

```
PUCCH-SpatialRelationInfo ::=              SEQUENCE {
    pucch-SpatialRelationInfoId                PUCCH-SpatialRelationInfoId,
    servingCellId                              ServCellIndex
        OPTIONAL, -- Need S
    higherLayerIndex                           INTEGER(0,1)
    referenceSignal                            CHOICE {
        ssb-Index                                  SSB-Index,
        csi-RS-Index                               NZP-CSI-RS-ResourceId,
        srs                                        SEQUENCE {
                                                       resource SRS-ResourceId,
                                                       uplinkBWP BWP-Id
                                                   }
    },
    pucch-PathlossReferenceRS-I                PUCCH-PathlossReferenceRS-Id,
    p0-PUCCH-Id                                P0-PUCCH-Id,
    closedLoopIndex                            ENUMERATED { i0, i1 }
}
```

At 1220, the processing element may transmit the PUCCH based on a higher layer index value corresponding to a selected control resource set (CORESET) from a plurality of configured CORESETs in order to target a transmission-reception point (TRP) associated with the higher layer index value. The plurality of CORESETs may be configured, e.g., as variously described above.

In some embodiments, the selected CORESET is the CORESET having a lowest CORESET ID among said configured CORESETs.

In some embodiments, the selected CORESET is the CORESET having a highest CORESET ID among said configured CORESETs.

In some embodiments, the selected CORESET is a CORESET that has been indicated by higher layer signaling.

In some embodiments, the selected CORESET is a CORESET with lowest CORESET ID among monitored CORESETs from the last slot before a present PUCCH opportunity.

In some embodiments, HLI value defaults to zero when an HLI value is not configured for the selected CORESET.

In some embodiments, the PUCCH is activated in response to receiving a configuration message that includes a field for the higher layer index value.

Spatial relation information may be used by the UE to determine a spatial domain transmission filter (e.g., a transmit beam) for a UE. A TRP (or gNB of 5G NR) may transmit spatial relation information to the UE when it determines that there is a need to update a beam or power control parameter for the UE.

In some embodiments, the association between higher layer index and each PUCCH resource group may be configured by higher layer signaling.

In some embodiments, the PUCCH resource group is used for group based spatial relation update for PUCCH resource.

In some embodiments, a method 1300 for operating a wireless user equipment (UE) device may include the operations shown in FIG. 13. (The method 1300 may also include any subset of the elements, embodiments and features described above in connection with FIGS. 1-12 and below in connection with FIG. 14. The wireless UE device may be configured as variously described above, e.g., as described in connection with user equipment 600 of FIG. 6. The method 1300 may be performed by a processing element of the UE device.

At 1310, the processing element may receive a configuration message from a first transmission-reception point (TRP), wherein the configuration message indicates a value of a higher layer index (HLI). In some embodiments, the configuration message may be a Radio Resource Control (RRC) message.

At 1320, the processing element may transmit a Physical Uplink Control Channel (PUCCH) based on the value of the higher layer index to target the first TRP. The higher layer index value may be used to select appropriate content for the PUCCH, i.e., content appropriate for the TRP that corresponds to the higher layer index value.

In some embodiments, the configuration message may direct the UE device to configure the HLI index value for a particular PUCCH resource or a particular PUCCH resource.

In some embodiments, the configuration message may include spatial relation information for the PUCCH, e.g., as variously described above.

In some embodiments, the configuration message may direct the UE device to configure the HLI index value for a particular PUCCH resource group.

Channel (PUCCH) to be transmitted, wherein the HLI value is associated with a transmission-reception point (TRP).

At 1420, the processing element may transmit the PUCCH based on the value of the higher layer index in order to target the PUCCH to the TRP.

In some embodiments, the HLI value may be determined based on a group index of a PUCCH resource group that the PUCCH is to be transmitted in.

In some embodiments, the HLI value may be determined by (or based on) an index of a PUCCH resource that the PUCCH is to be transmitted in.

In some embodiments, the HLI value may be determined by (or based on) an index of a PUCCH resource set that the PUCCH is to be transmitted in. The PUCCH resource set may include a number of PUCCH resources.

In some embodiments, a PUCCH resource set may be defined or configured using the following structure.

```
PUCCH-Resource Set ::=          SEQUENCE {
    pucch-ResourceSetId         PUCCH-ResourceSetId,
    resourceList                SEQUENCE (SIZE(1..maxNrofPUCCH-ResourcesPerSet))
    OF PUCCH-ResourceId,        maxPayloadMinus1 INTEGER
    (4..256)                        OPTIONAL
}
```

In some embodiments, the processing element may receive a second configuration message from a second TRP, where the second configuration message indicates a second value of the HLI, and transmit a second PUCCH based on the second HLI value to target the second TRP.

Implicitly Derived Association of PUCCH and HLI

In some embodiments, the association between PUCCH and higher layer configured index may be implicitly derived.

In some embodiments, the association may be determined by a group index. For example, the first half of groups may be associated with higher layer index 0, and the second half of groups may be associated with higher layer index 1. As a particular example, groups 0 and 1 may be associated with higher layer index 0, and groups 2 and 3 may be associated with higher layer index 1.

In some embodiments, the association may be determined by the PUCCH resource index.

In some embodiments, the association may be determined by the PUCCH resource set index.

In some embodiments, the association between PUCCH and configured higher layer index may be based on PUCCH information type. Examples of PUCCH information types include scheduling request (SR), or beam failure report (BFR). The mapping between types and HLI values may be predefined.

In some embodiments, a method 1400 for operating a wireless user equipment (UE) device may include the operations shown in FIG. 14. (The method 1400 may also include any subset of the elements, embodiments and features described above in connection with FIGS. 1-13 and below in connection with FIGS. 15-16.) The wireless UE device may be configured as variously described above, e.g., as described in connection with user equipment 600 of FIG. 6. The method 1400 may be performed by a processing element of the UE device.

At 1410, the processing element may determine a value of a higher layer index (HLI) for a Physical Uplink Control However, it should be understood that a wide variety of other structures are possible and contemplated.

In some embodiments, the HLI value may be determined by a predefined mapping between PUCCH information types and HLI values.

Association Between Configured-Grant PUSCH and Higher Layer Index

In some embodiments, the following options may be used to determine the association between configured-grant based PUSCH and higher layer index configured per CORESET. A configured-grant PUSCH is a PUSCH whose physical resources have been configured by a configuration message (e.g., an RRC message) transmitted to the UE by a transmission-reception point (TRP) or base station.

In one embodiment, the higher layer index for PUSCH may be configured explicitly by RRC, or predefined (e.g., to be zero or some other suitable value). RRC is an acronym for Radio Resource Control.

In another embodiment, the higher layer index for PUSCH may be derived based on the indicated SRS resource indicator (SRI). SRS is an acronym for Sounding Reference Symbol.

In yet another embodiment, the mapping between higher layer index and SRI may be predefined.

In yet another embodiment, the mapping between higher layer index and SRI may be configured by higher layer signaling.

In yet another embodiment, the higher layer index may be configured in the spatial relation info for the SRS, e.g., as shown below. (BWP is an acronym for Bandwidth Part. CSI is an acronym for Channel State Information. RS is an acronym for Reference Signal. SSB is an acronym for Synchronization Signal Block. NZP is an acronym for NonZero Power.)

```
SRS-SpatialRelationInfo ::=        SEQUENCE {
    servingCellId                      ServCellIndex OPTIONAL, -- Need S
    higherLayerIndex                   INTEGER(0,1)
    referenceSignal                    CHOICE {
        ssb-Index                          SSB-Index,
        csi-RS-Index                       NZP-CSI-RS-ResourceId,
        srs                                SEQUENCE {
            resourceId                         SRS-ResourceId,
            uplinkBWP                          BWP-Id
        }
    }
}
```

In some embodiments, a method 1500 for operating a wireless user equipment (UE) device may include the operations shown in FIG. 15. (The method 1500 may also include any subset of the elements, embodiments and features described above in connection with FIGS. 1-14 and below in connection with FIG. 16.) The wireless UE device may be configured as variously described above, e.g., as described in connection with user equipment 600 of FIG. 6. The method 1500 may be performed by a processing element of the UE device.

At 1510, the processing element may determine a value of a higher layer index (HLI) for a configured-grant Physical Uplink Shared Channel (PUSCH) to be transmitted, wherein the HLI value is associated with a transmission-reception point (TRP).

At 1520, the processing element may transmit the PUSCH based on the value of the higher layer index to target the PUSCH to the TRP. The higher layer index value may be used, e.g., to select appropriate control information to be included in the PUSCH, i.e., control information for the TRP associated with the HLI value.

In some embodiments, the HLI value for the configured-grant PUSCH may be configured by a Radio Resource Control (RRC) message from the TRP.

In some embodiments, the HLI value for the configured-grant PUSCH may be determined based on a value of a Sounding Reference Signal (SRS) resource indicator (SRI).

In some embodiments, the mapping between HLI values and SRI values may be predefined.

In some embodiments, the mapping between HLI values and SRI values may be configured by higher layer signaling.

In some embodiments, the HLI value for the configured-grant PUSCH may be equal to an HLI value contained in spatial relation information for a Sounding Reference Signal (SRS).

Association Between MsgA PUSCH and Higher Layer Index

In some embodiments, any of the following options may be used to determine the association between MsgA PUSCH in 2-step random access (RACH) procedure and higher layer index configured per CORESET.

In some embodiments, the higher layer index may be explicitly configured per PUSCH resource unit.

In some embodiments, higher layer index may be explicitly configured per PUSCH opportunity.

In some embodiments, the higher layer index for MsgA PUSCH may be predefined, e.g., zero, or any other suitable value.

In some embodiments, each PUSCH opportunity is configured with independent time/frequency resources. Each PUSCH opportunity may include one or more PUSCH resource units.

In some embodiments, different PUSCH resources could be configured with different DMRS port index and scrambling ID. (DMRS is an acronym for Demodulation Reference Signal.)

In some embodiments, a method 1600 for operating a wireless user equipment (UE) device may include the operations shown in FIG. 16. (The method 1600 may also include any subset of the elements, embodiments and features described above in connection with FIGS. 1-15 and variously below.) The wireless UE device may be configured as variously described above, e.g., as described in connection with user equipment 600 of FIG. 6. The method 1600 may be performed by a processing element of the UE device.

At 1610, the processing element may determine a value of a higher layer index (HLI) for a Physical Uplink Shared Channel (PUSCH) to be transmitted as part of a two-step random access procedure, wherein the HLI value is associated with a transmission-reception point (TRP).

At 1620, the processing element may transmit the PUSCH based on the value of the higher layer index in order to target the PUSCH to the TRP. The higher layer index value may be used, e.g., to select control information appropriate for the TRP associated with the higher layer index value.

In some embodiments, the HLI value may be determined by an HLI value that has been configured for a PUSCH resource unit that is to contain the PUSCH transmission.

In some embodiments, the HLI may be determined by an HLI value that has been configured for a PUSCH opportunity that is to contain the PUSCH transmission.

In some embodiments, the HLI value may be set to a predefined value common to all MsgA PUSCH transmissions.

In some embodiments, different PUSCH opportunities may be configured with independent time-frequency resources.

In some embodiments, different PUSCH resources may be configured with different port index values for demodulation reference signal (DMRS) and/or different scrambling ID.

In some embodiments, a method for operating a wireless user equipment (UE) device may include one or more of the following operations. (The operations may be performed by a processing element of the UE device.)

The method may include determining a first higher layer index value for first uplink control information to be transmitted, wherein the higher layer index has a set of possible values that correspond respectively to transmission-reception points in communication with the UE device.

The method may include transmitting the first uplink control information on a first Physical Uplink Control Channel (PUCCH) or a first Physical Uplink Shared Channel (PUSCH), based on the first value of a higher layer index, to enable a first TRP, corresponding to the first higher layer index value, to receive the first uplink control information.

In some embodiments, the method may include: determining a second higher layer index value for second uplink control information to be transmitted; and transmitting second uplink control information on a second Physical Uplink Control Channel (PUCCH) or a second Physical Uplink Shared Channel (PUSCH), based on the second higher layer index value, to enable a second TRP, corresponding to the second higher layer index value, to receive the second uplink control information.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, a computer implanted in a biological organism, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a wireless user equipment (UE) device, the method comprising:
   receiving configuration information comprising a first value of a pool index for a first control resource set (CORESET), wherein the pool index is configured to be one of a 1 or a 0, wherein respective values of the pool index have respective one to one associations with respective transmission and reception points (TRPs);
   receiving a first Physical Downlink Control Channel (PDCCH) transmission on the first CORESET scheduling a first Physical Downlink Shared Channel (PDSCH) transmission from a first TRP;
   transmitting, in response to the first PDSCH transmission, a first aperiodic report of control information in a first Physical Uplink Control Channel (PUCCH) transmission, wherein the first PUCCH transmission is associated with the first value of the pool index corresponding to the first CORESET carrying the first PDCCH transmission scheduling the first PDSCH; and
   transmitting, in response to a second PDSCH transmission, a second aperiodic report of control information in a second PUCCH transmission, wherein the second PUCCH transmission is associated with a second value of the pool index corresponding to a second CORESET carrying a second PDCCH transmission scheduling the second PDSCH, wherein the pool index is not configured for the second CORESET.

2. The method of claim 1, wherein the configuration information directs the UE device to configure a pool index value for a particular PUCCH resource or a particular PUCCH resource.

3. The method of claim 1, wherein the configuration information includes spatial relation information for the PUCCH.

4. The method of claim 1, wherein the configuration information directs the UE device to configure a pool index value for a particular PUCCH resource group.

5. The method of claim 1, wherein the first PDCCH also schedules an aperiodic report of control information in the first PUCCH transmission.

6. The method of claim 5, wherein the pool index value is used to select appropriate control information to include in the first PUCCH transmission.

7. The method of claim 1, further comprising receiving a downlink message that configures resources for transmission of a semi-persistent type and/or a periodic type of control information in the PUCCH.

8. The method of claim 1, further comprising selecting a selected CORESET from a plurality of configured CORESETs, wherein the selected CORESET is the CORESET having a highest or lowest CORESET ID among said configured CORESETs.

9. The method of claim 1, further comprising selecting a selected CORESET from a plurality of configured CORESETs, wherein the selected CORESET is a CORESET that has been indicated by higher layer signaling.

10. The method of claim 1, further comprising selecting a selected CORESET from a plurality of configured CORESETs, wherein the selected CORESET is a CORESET with lowest CORESET ID among monitored CORESETs from a last slot before a present PUCCH opportunity.

11. The method of claim 1, further comprising selecting a selected CORESET from a plurality of configured CORESETs, wherein the PUCCH is activated in response to receiving the configuration information.

12. The method of claim 1, wherein the second value of the pool index is 0 and the first value of the pool index is 1.

13. A user equipment (UE) device, comprising:
   a radio; and
   a processor operably coupled to the radio and configured to cause the UE device to perform operations including:
      receiving configuration information comprising a first value of a pool index for a first control resource set (CORESET), wherein the pool index is configured to be one of a 1 or a 0, wherein respective values of the pool index have respective one to one associations with respective transmission and reception points (TRPs);

receiving a first Physical Downlink Control Channel (PDCCH) transmission on the first CORESET scheduling a first Physical Downlink Shared Channel (PDSCH) transmission from a first TRP;

transmitting, in response to the first PDSCH transmission, a first aperiodic report of control information in a first Physical Uplink Control Channel (PUCCH) transmission, wherein the first PUCCH transmission is associated with the first value of the pool index corresponding to the first CORESET carrying the first PDCCH transmission scheduling the first PDSCH; and transmitting, in response to a second PDSCH transmission, a second aperiodic report of control information in a second PUCCH transmission, wherein the second PUCCH transmission is associated with a second value of the pool index corresponding to a second CORESET carrying a second PDCCH transmission scheduling the second PDSCH, wherein the pool index is not configured for the second CORESET.

14. The UE device of claim 13, wherein the configuration information includes spatial relation information for the PUCCH.

15. The UE device of claim 13, wherein the first PDCCH also schedules an aperiodic report of control information in the first PUCCH transmission.

16. The UE device of claim 13, further comprising receiving a downlink message that configures resources for transmission of a semi-persistent type and/or a periodic type of control information in the PUCCH.

17. A method for operating a cellular network, the method comprising:

transmitting, to a user equipment (UE) device, configuration information comprising a first value of a pool index for a first control resource set (CORESET), wherein the pool index is configured to be one of a 1 or a 0, wherein respective values of the pool index have respective one to one associations with respective transmission and reception points (TRPs);

transmitting, to the UE device, a first Physical Downlink Control Channel (PDCCH) transmission on the first CORESET scheduling a first Physical Downlink Shared Channel (PDSCH) transmission from a first TRP;

receiving, from the UE device, in response to the first PDSCH transmission, a first aperiodic report of control information in a first Physical Uplink Control Channel (PUCCH) transmission, wherein the first PUCCH transmission is associated with the first value of the pool index corresponding to the first CORESET carrying the first PDCCH transmission scheduling the first PDSCH; and receiving, from the UE device, in response to a second PDSCH transmission, a second aperiodic report of control information in a second PUCCH transmission, wherein the second PUCCH transmission is associated with a second value of the pool index corresponding to a second CORESET carrying a second PDCCH transmission scheduling the second PDSCH, wherein the pool index is not configured for the second CORESET.

18. The method of claim 17, wherein the configuration information includes spatial relation information for the PUCCH.

19. The method of claim 17, wherein the first PDCCH also schedules an aperiodic report of control information in the first PUCCH transmission.

20. The method of claim 17, further comprising transmitting a downlink message that configures resources for transmission of a semi-persistent type and/or a periodic type of control information in the PUCCH.

* * * * *